Feb. 5, 1957 A. HUET 2,780,446
HEAT EXCHANGERS
Filed April 28, 1954 2 Sheets-Sheet 1
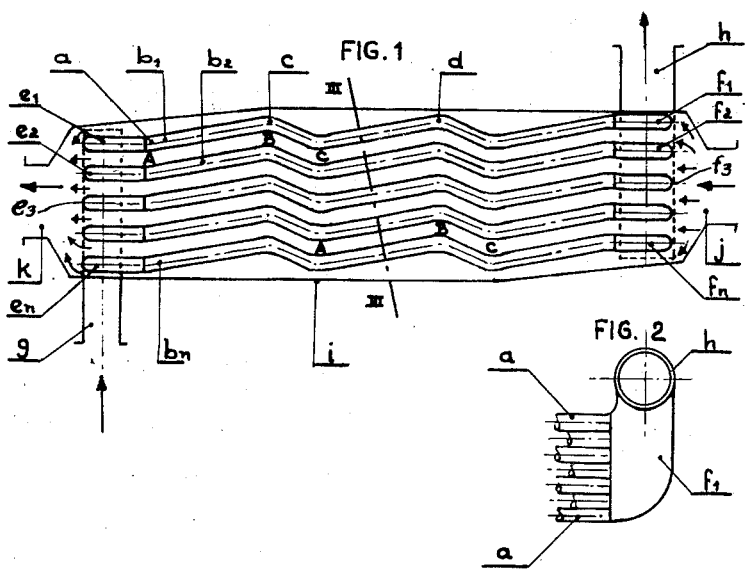
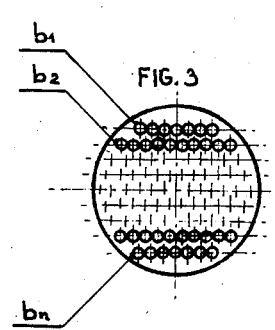
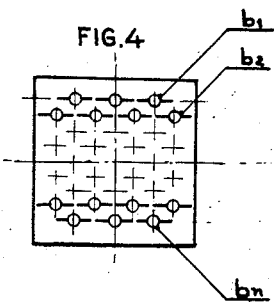
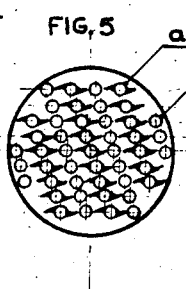
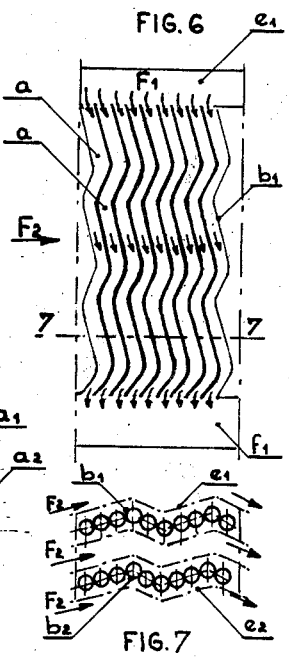

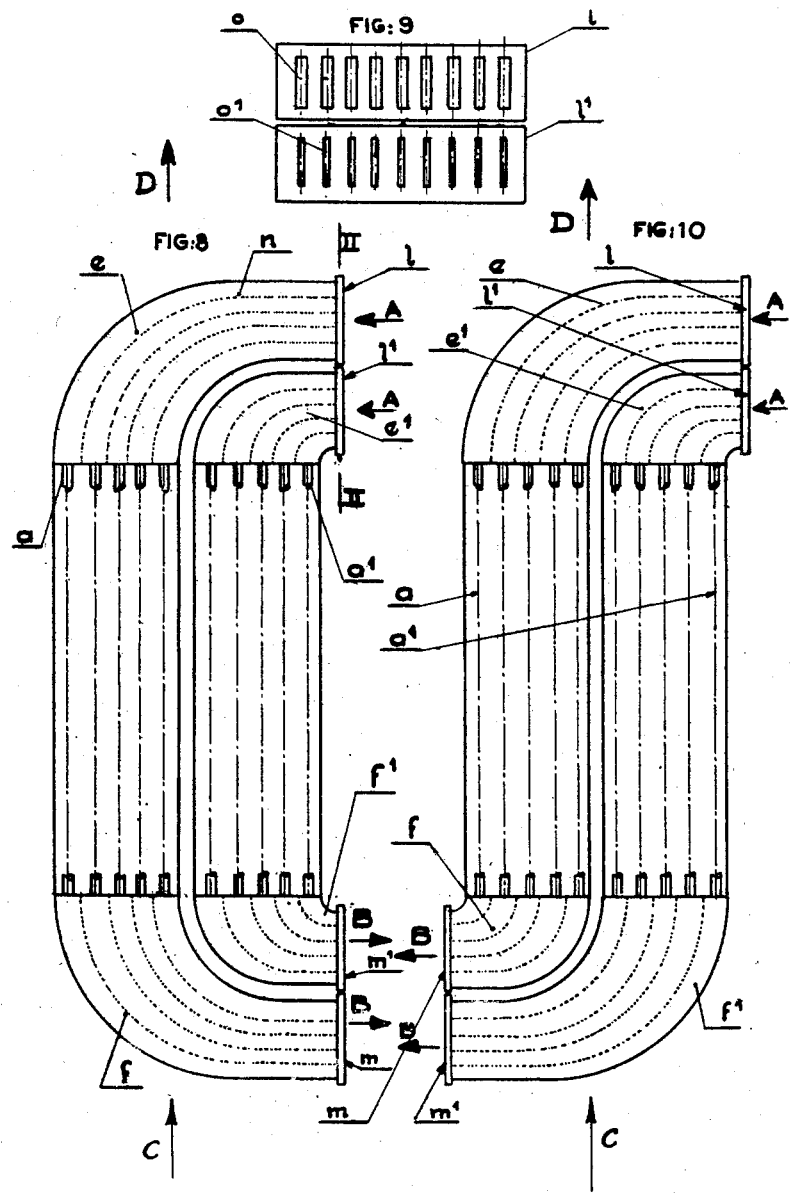

United States Patent Office 2,780,446
Patented Feb. 5, 1957

2,780,446

HEAT EXCHANGERS

André Huet, Paris, France

Application April 28, 1954, Serial No. 426,196

Claims priority, application France March 4, 1953

4 Claims. (Cl. 257—245)

This invention relates to heat exchangers for the exchange of heat between two fluids of the type in which one fluid flows within one or more tubes and the other fluid flows outside the tubes.

Known apparatus for the exchange of heat between two fluids is, in general, of one of two types:

One, the so-called tubular type, comprises straight tubes, which may be provided with fins, in the interior of which flows one of the two fluids, whereas the other fluid flows externally, usually either in a direction parallel to the axes of the tubes, or in a direction perpendicular to them.

The other, the so-called laminated type, comprises stacks of metal sheets with the fluids, the heat-content of which is to be exchanged, flowing through the alternate interspaces between the sheets. It has already been suggested to corrugate the partitions in order to produce changes in the direction of flow, the velocity and the pressure of each of the flowing fluids, and thereby improve the transfer of heat between them.

The tubular apparatus is generally more robust and resistant to shock and is capable of withstanding higher pressures. The laminated type, on the other hand, offers better performance by virtue of the corrugations.

According to this invention an apparatus for the exchange of heat between two fluids comprises tubes within which one of the fluids can flow and outside which the other fluid can flow, the tubes being arranged in layers of undulated form.

The tubes in each layer may be contiguous.

The undulations may lie in planes perpendicular to the layers and the fluid outside the tubes may flow substantially parallel to the axes of the tubes and in the sense opposite to that in which the fluid within the tubes flows or the fluid outside the tubes may flow substantially perpendicularly to the tubes in which case the tubes are preferably of undulated form in the plane of each layer as well as in planes perpendicular to each layer.

The tubes may be smooth or provided with longitudinal fins, extending axially or tangentially from the tubes. If desired, one and the same apparatus may comprise both these types of tube. The tubes may be arranged in parallel rows or may be staggered, that is to say one layer of tubes may be displaced laterally with respect to the following row. Each of these layers of tubes constitutes a partial barrier acting similarly to the partition in the form of a metal sheet in the laminated type of heat exchanger.

Apparatus constructed in accordance with the invention is more resistant to shock and capable of withstanding higher pressures than is usually the case with the laminated type of heat exchanger at the same time as providing better performance than that generally obtained with tubular heat exchangers having straight tubes. Furthermore, and in contradistinction to what happens in the case of laminated heat exchangers, the layers of tubes which separate the main passages in which the external fluid circulates, are not completely impermeable to the external fluid as is the case with laminated exchangers but can be made semi-permeable and may allow the external fluid to pass from one passage between layers to an adjacent passage. This ensures better utilisation of the surface of the tubes, correspondingly enhances the performance of the exchanger, and also prevents or reduces the accumulation of cinders between the tubes. It also enables any deposit to be blown out transversely to the tubes.

The general form of the undulations may be symmetrical or asymmetrical. It is, however, of special advantage to use asymmetrical undulations comprising a long leg followed by a considerably shorter leg. In such a case the apex angle of the undulation is much greater than 90°, whereas the angle between the shorter leg and the general plane of a row of tubes is less than 60°.

Apparatus constructed in accordance with the invention will now be described by way of example in greater detail with reference to the accompanying drawings in which:

Fig. 1 is a side elevation in section of a heat exchanger with the layers of tubes undulating in a plane perpendicular to the layers of tubes.

Fig. 2 is a right-angle detail view of the collector and of a union feeding the internal fluid to the inlet of a batch of tubes.

Fig. 3 is a section on III—III in Fig. 1.

Fig. 4 is a section analogous to that of Fig. 3 of an embodiment in which the tubes are provided with radially extending fins and the housing is of rectangular cross-section.

Fig. 5 is a section analogous to Fig. 3 of an embodiment in which some of the tubes are provided with tangentially extending fins.

Fig. 6 is a plan view of another embodiment showing a layer of tubes having undulations in the plane of the layer.

Fig. 7 is a section on 7—7 in Fig. 6.

Fig. 8 is a plan view of a detachable layer of the heat exchanger, the layer being of U-shape and divided into two parts.

Fig. 9 is a section on II—II in Fig. 8.

Fig. 10 is a plan view of an embodiment in which the layers of tubes are of S-shape.

One, the so-called tubular type, comprises shraight tubes, ranged in layers $b^1$, $b^2$—$b^n$ (Fig. 3). The tubes making up each layer are smooth, and may be almost contiguous, as shown in Fig. 3. According to the invention these tubes are of undulated form at $c$, $d$, in a plane perpendicular to the layer, being bent at $c$, $d$. In Fig. 1 only a few of the undulations and a few layers of tubes are shown for the sake of clarity.

Each layer of tubes $b^1$, $b^2$—$b^n$ is connected at its inlet and outlet ends with a union $e^1$, $f^1$, $e^2$, $f^2$ etc., common to all tubes of one row. All inlet unions $e^1$, $e^2$—$e^n$ end in a general inlet header $g$ for the internal fluid, and the outlet ends of outlet unions $f^1$, $f^2$—$f^n$ are connected with an outlet header $h$ for the internal fluid.

The whole is contained in a shell or casing $i$ which is in connection with the inlet connector $j$ for the external fluid, and with the outlet collector $k$ for the external fluid.

Instead of being smooth, as shown in Fig. 3, the tubes may be provided with longitudinal fins extending from them either radially, as shown in Fig. 4, or tangentially as shown in Fig. 5. Between one layer $b^1$ and the following layer $b^2$ the tubes are preferably staggered as shown in Fig. 4, in order that the vertical intervals between successive layers may be reduced.

It is also possible to combine smooth tubes and tubes having longitudinal fins, as shown for instance in Fig. 5 in which in each layer of tubes $b^1$, $b^2$—tubes with tangentially extending fins $a^1$ alternate with smooth tubes $a^2$.

The undulations of the tubes $a$ may be of desired form, either symmetrical or asymmetrical. In a preferred embodiment these undulations are asymmetrical and such that, as shown in Fig. 1, each undulation consists of a long leg AB followed by a short leg BC. The apex angle B is considerably greater than 90°, whereas the angle of inclination of the short leg BC, the one most inclined to the plane of the layer of tubes $b^1$ is less than 60°.

In this arrangement the internal fluid flowing through each tube is subject to changes in direction, and possibly to changes in velocity and in pressure, which, as is known, ensure the tearing away or destruction of the fluid film which tends to adhere to the internal wall of the tube and hinder the exchange of heat.

The fact that, during the manufacture of the undulated tube, it is possible for the tube to be slightly pinched at B, is an advantage, because the reduced cross-section resulting therefrom produces a waist which accentuates the changes in velocity and in pressure of the fluids circulating inside the tube.

Between the successive layers of tubes $b^1$, $b^2$—$b^n$ undulated in this manner there are formed passages through which the external fluid flows, preferably in counter-current fashion, in the direction of the arrows. Owing to the undulations of the layers the external fluid circulating in these passages is likewise subjected to changes in direction, in velocity and in pressure, which changes promote the exchange of heat. Furthermore, since each layer of tubes $b^1$, $b^2$—$b^n$ does not form a barrier impermeable to the external fluid (as is the case with a sheet metal partition), the external fluid can pass between the almost contiguous tubes forming the layer (or in between the almost contiguous fins in the case of finned tubes) from one of the passages between two consecutive layers into adjacent passages, which further assists the exchange of heat. It also has the advantage that cinders or other scale matter accumulating between the tubes can, if necessary, be removed by blowing air through the tubes in a crosswise direction.

In this form of heat-exchanger, the external fluid flows in the passages between layers in a direction substantially parallel to the axes of the tubes.

Where it is desired that the external fluid should flow in a direction substantially perpendicular to the axes of the tubes, the form of heat-exchanger shown in Figs. 6 and 7 is suitable. In this case the contiguous tubes $a$ forming a layer $b^1$, are undulated as shown in Fig. 6 in the plane of the layer $b^1$, and the layer assembly $b^1$ is (as shown in section in Fig. 7) itself undulated by virtue of a suitable undulation of the collectors $e^1$, $f^1$, $e^2$, $f^2$, etc., to which are connected the tubes $a$ in a manner such that the passages forming between consecutive layers $b^1$, $b^2$ etc. (Fig. 7), ensure by their undulations the change in direction, in velocity and in pressure of the external fluid current. As can be seen from the fluids circulating in cross-current fashion in the direction indicated by arrows $F^1$ for the internal fluid, and arrows $F^2$ for the external fluid, this arrangement ensures—both for the internal fluid $F^1$ which flows inside the tubes $a$ and for the external fluid $F^2$ which circulates at right angles to the former in the passages between layers $b^1$, $b^2$—the advantages of the undulations.

The inlet unions or distributors $e^1$, $e^2$, $e^3$, and the outlet unions or distributors $f^1$, $f^2$, $f^3$ can, instead of being welded on to the collectors $gh$, be arranged in removable fashion on tubular inlet plates $l$ and outlet plates $m$.

In this manner the exchanger can be assembled from removable tubes. In case a layer should prove too heavy and difficult to handle, it is divided, as shown in Fig. 8, in two parts, viz. an "external" part formed by tubes $a$ with unions $e$ or $f$, and an "internal" part formed by tubes $a^1$ connected to unions $e^1$, $f^1$.

In the form shown in Fig. 8, the general shape of the layer is that of a U, the tubular inlet plates $l$ and outlet plates $m$ being located on the same side of the apparatus.

The fluid flowing within the tubes enters in the direction of the arrows A and leaves in the direction of arrows B. The fluid flowing externally between the layers enters, for example, in the direction of arrows C and issues in the direction of arrows D.

Inside the distributors $e$, $e^1$, $f$, $f^1$ there are preferably provdied partitions $n$ which ensure the distribution of the internal fluid among the tubes $a$ of the layer.

In the arrangement shown in Fig. 8 the path of the internal fluid in the "internal" portion of the layer $e^1$, $a^1$, $f^1$ is shorter than that in the "external" portion of the layer $e$, $a$, $f$. To ensure that despite this fact, the temperature of the fluid issuing from the two portions in the direction of arrows B is the same, the sections of the distributors $e^1$ and $e$ must be suitably modified. For this purpose the tubular plate $l$, which corresponds to the "external" portion $e$, $a$, $f$, has orifices $o$ (see Fig. 9) having an area of cross-section larger than that of orifices $o^1$ of the internal plate $l^1$ to which correspond the distributors $e^1$. This produces a difference between the rate of flow of the internal fluid in the two divisions of the layer, that in the "external" portion of the layer which having the greater length of passage for the fluid being higher, and that in the "internal" portion being lower. In this way the temperatures of the internal fluid at the outlet of portions $e$, $a$, $f$ on one hand and $e^1$, $a^1$, $f^1$ on the other are equalised.

Each of the tubular plates $l$, $l^1$ or $m$, $m^1$ can of course be made in one piece instead of in two pieces.

Where the tubular plates are not located on the same side of the apparatus, but instead on two opposite sides, the general shape of the layer is that of an S, as shown in Fig. 10. In this case, too, the orifices provided in the tubular plates $l$, $l^1$ or $m$, $m^1$ are such that the temperature of the fluid at the delivery end (arrow B) is identical for the portion of the layer $e$, $a$, $f$ and for the portion $e^1$, $a^1$, $f^1$.

What I claim is:

1. Apparatus for the exchange of heat between two fluids, comprising a casing, layers of approximately contiguous tubes parallelly disposed inside the casing, the tubes being undulated in a plane perpendicular to the layer, an entrance union and an outlet union for the tubes of each layer, said unions being respectively connected to an entrance header and an outlet header for the fluid circulating inside the tubes, an entrance and an outlet in the casing for the second fluid circulating between the layers of tubes in a direction longitudinal of said tubes and opposite to the circulation inside the tubes.

2. Apparatus for the exchange of heat between two fluids, comprising a casing, layers of approximately contiguous tubes parallelly disposed inside the casing, the tubes being asymmetrically undulated in a plane perpendicular to the layers, an entrance union and an outlet union for the tubes of each layer, said unions being respectively connected to an entrance header and an outlet header for the fluid circulating inside the tubes, an entrance and an outlet in the casing for the second fluid circulating between the layers of tubes in a direction longitudinal of said tubes and opposite to the circulation inside the tubes.

3. Apparatus for the exchange of heat between two fluids, comprising a casing, layers of approximately contiguous tubes parallelly disposed inside the casing, the tubes being asymmetrically undulated in a plane perpendicular to the layer, the asymmetrical undulation being such that the apex angle of the undulation is greater than 90° and the angle of inclination of the shorter leg to the layer is less than 60°, an entrance union and an outlet union for the tubes of each layer, said unions being respectively connected to an entrance header and an outlet header for the fluid circulating inside the tubes, an entrance and an outlet in the casing for the second fluid circulating between the layers of tubes in a direction longitudinal of said tubes and opposite to the circulation inside the tubes.

4. Apparatus for the exchange of heat between two fluids, comprising a casing, layers of approximately contiguous tubes parallelly disposed inside the casing, the tubes being undulated in a plane perpendicular to the layer, longitudinal fins on some of the tubes of each layer, said fins being approximately contiguous to the adjacent tubes of the layer, an entrance union and an outlet union for the tubes of each layer, said unions being respectively connected to an entrance header and an outlet header for the fluid circulating inside the tubes, an entrance and an outlet in the casing for the second fluid circulating between the layers of tubes in a direction longitudinal of said tubes and opposite to the circulation inside the tubes.

References Cited in the file of this patent

UNITED STATES PATENTS

| | | |
|---|---|---|
| 401,685 | Canfield | Apr. 16, 1889 |
| 1,734,962 | Clarke | Nov. 12, 1929 |
| 1,787,118 | Murray | Dec. 30, 1930 |
| 1,884,777 | Lucke | Oct. 25, 1932 |
| 2,147,475 | Wilbur | Feb. 14, 1939 |
| 2,519,084 | Tull | Aug. 15, 1950 |
| 2,578,136 | Huet | Dec. 11, 1951 |
| 2,677,532 | Huet | May 4, 1954 |

FOREIGN PATENTS

| | | |
|---|---|---|
| 117,915 | Sweden | Jan. 7, 1947 |